MÁTHIÁS LÁMPL & MATHIAS LAMPL.
ROAD MACHINE.
APPLICATION FILED JUNE 25, 1909.
938,249.
Patented Oct. 26, 1909.
3 SHEETS—SHEET 1.
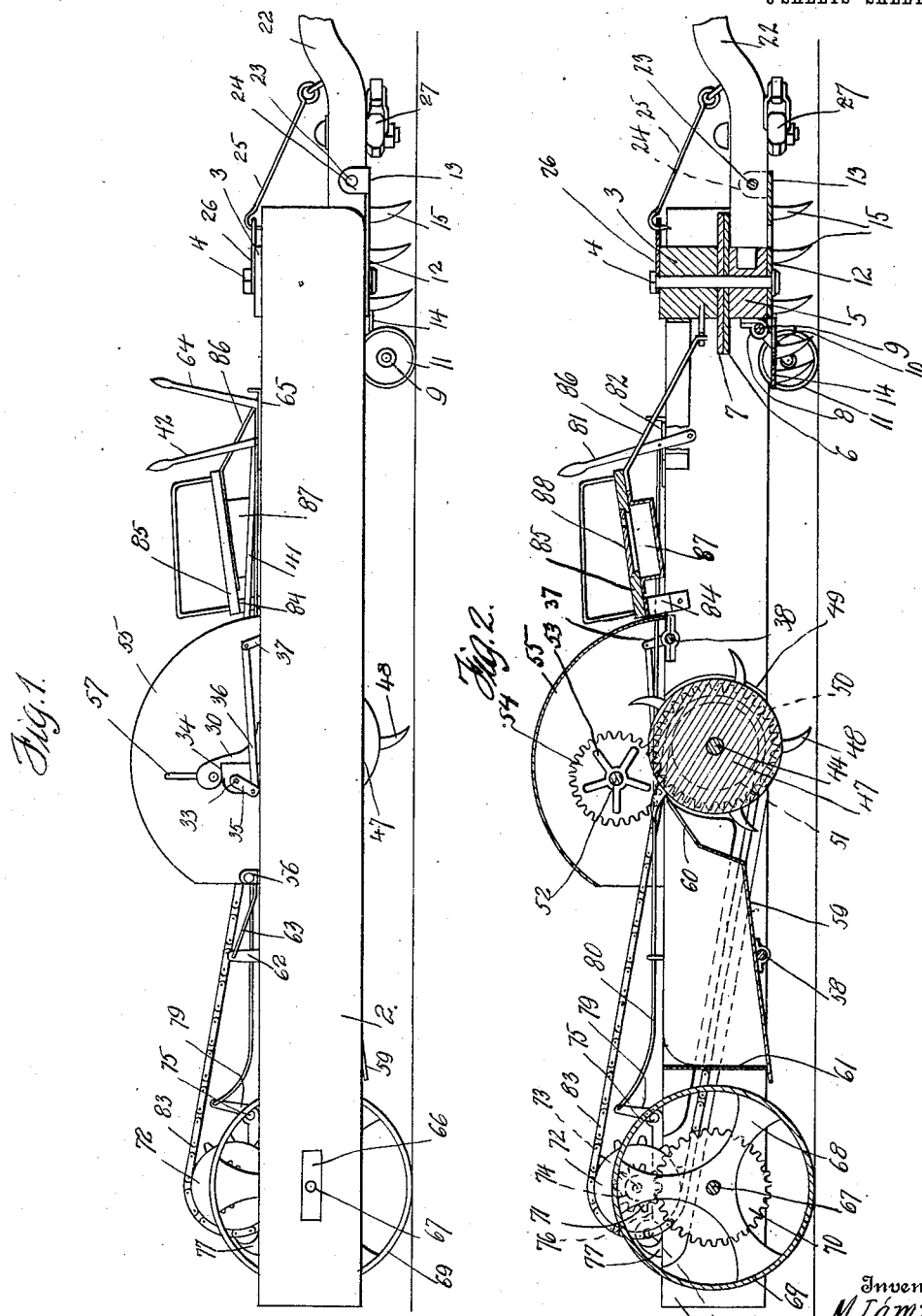

MÁTHIÁS LÁMPL & MATHIAS LAMPL.
ROAD MACHINE.
APPLICATION FILED JUNE 25, 1909.
938,249.
Patented Oct. 26, 1909.
3 SHEETS—SHEET 2.
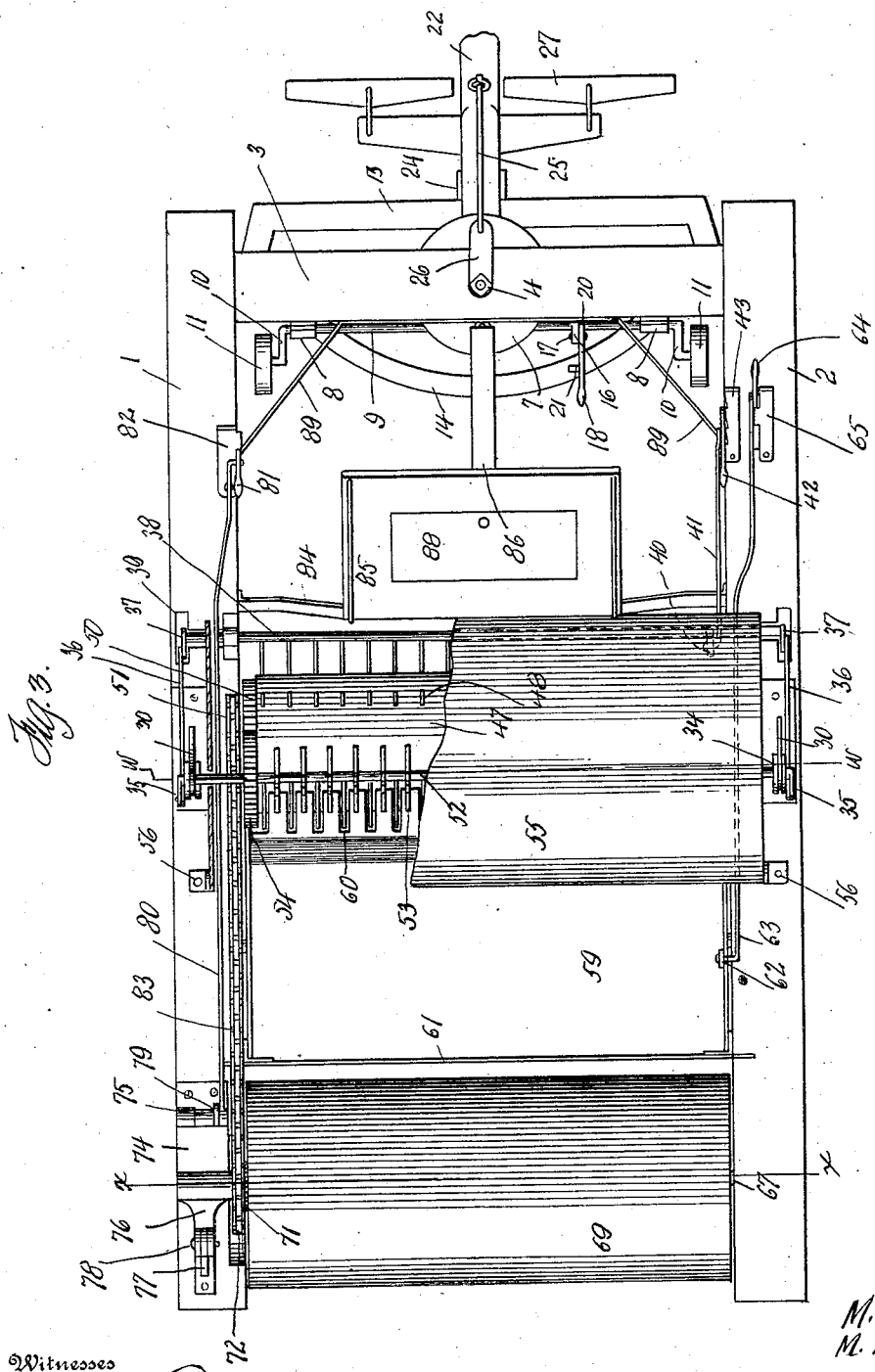

MÁTHIÁS LÁMPL & MATHIAS LAMPL.
ROAD MACHINE.
APPLICATION FILED JUNE 25, 1909.
938,249.
Patented Oct. 26, 1909.
3 SHEETS—SHEET 3.
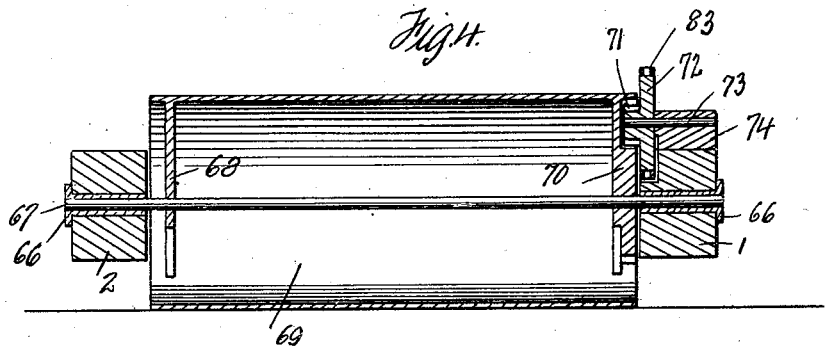
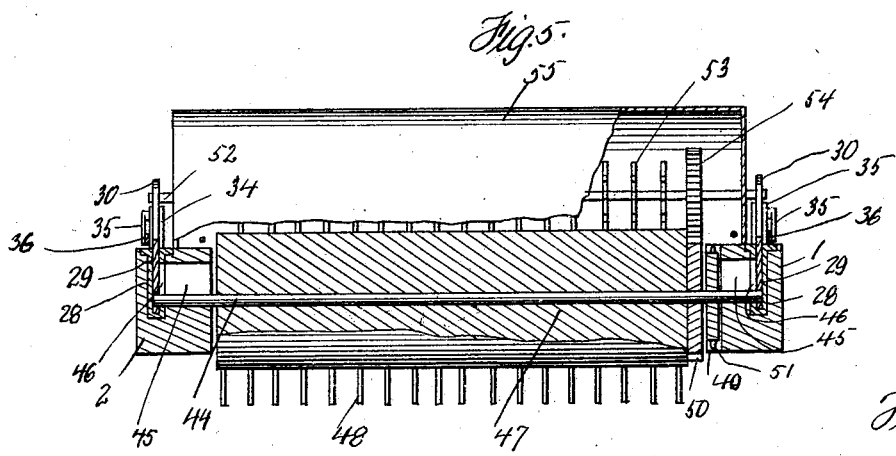
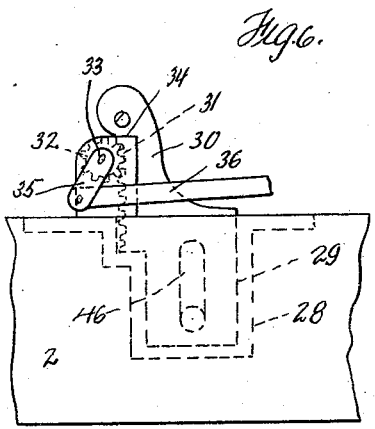
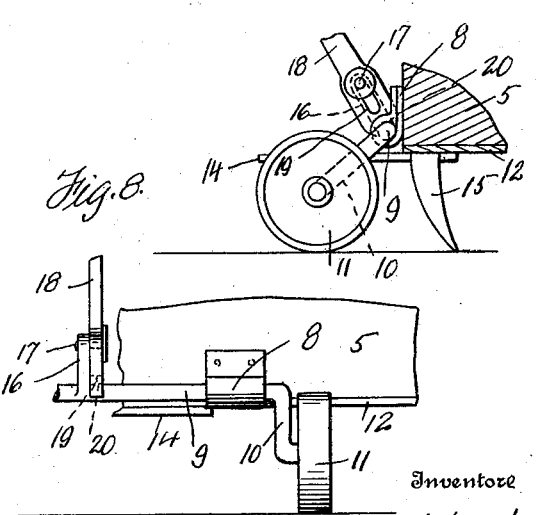

UNITED STATES PATENT OFFICE.

MÁTHIÁS LÁMPL AND MATHIAS LAMPL, OF SWISSVALE, PENNSYLVANIA.

ROAD-MACHINE.

938,249.   Specification of Letters Patent.   Patented Oct. 26, 1909.

Application filed June 25, 1909. Serial No. 504,337.

*To all whom it may concern:*

Be it known that we, MÁTHIÁS LÁMPL and MATHIAS LAMPL, subjects of the King of Hungary, residing at Swissvale, in the county of Allegheny and State of Pennsylvania, have invented certain new and useful Improvements in Road-Machines, of which the following is a specification, reference being had therein to the accompanying drawing.

This invention relates to a road machine, and the invention has for its primary object to provide a machine for facilitating the work of maintaining a road or public highway in perfect condition.

Another object of the invention is to provide a machine that can be used as an agricultural implement for tilling the soil.

A further object of the invention is to combine a harrow, stone crusher, stone gatherer and roller into a machine or implement easily operated and controlled for performing various kinds of work.

With the above and other objects in view, which will more readily appear as the invention is better understood, the improvement consists in the novel construction, combination, and arrangement of parts to be hereinafter described in detail and claimed.

Referring to the drawing, Figure 1 is a side elevation of a machine or implement constructed in accordance with our invention. Fig. 2 is a longitudinal sectional view of the same, Fig. 3 is a plan of the machine or implement partly broken away and partly in section, Fig. 4 is a cross-sectional view of the machine or implement taken on the line X X of Fig. 3, illustrating the roller, Fig. 5 is a similar view taken on the line W W of Fig. 3, Fig. 6 is an elevation of a portion of the machine illustrating the adjusting mechanism for the stone crusher, Fig. 7 is a sectional view of a portion of the machine illustrating the truck elevating means, and Fig. 8 is a rear elevation of a portion of the same.

The machine or implement comprises two parallel longitudinal beams 1 and 2 having the forward ends thereof connected by a transverse beam 3. Pivotally connected to this beam by a centrally located king bolt 4 is a truck comprising a bolster 5 having the upper face thereof provided with a fifth wheel member 6 coöperating with a similar member 7 carried by the beam 3.

8 denotes bearings carried by the rear side of the beam 3 and movably mounted in said bearings is an axle 9 having the ends thereof bent downwardly as at 10, and provided with revoluble wheels 11.

12 denotes a harrow plate screwed to the bottom of the bolster 5, said plate having a forwardly extending frame 13 and a rearwardly extending frame 14, both of said frames and said plate having depending harrow teeth 15.

16 denotes a crank carried by the axle 9, and loosely connected to said crank by a pin 17 is a lever 18 having a longitudinal slot or opening 19 to receive the pin 17. The end of the lever is recessed as at 20, to receive the axle 9, whereby said axle can be used as a fulcrum point in raising and lowering the revoluble wheels 11, to either place the harrow teeth 15 in engagement with the ground or soil over which the machine or implement passes or to retain the teeth out of engagement with the ground or soil. The last mentioned position of the teeth is accomplished by locking the lever 18 in a horizontal position in engagement with the catch 21 carried by the rearwardly extending frame 14 of the harrow plate 12.

22 denotes a tongue located centrally of the bolster 5 and resting upon the frame 13 to which frame the tongue is connected by a pin 23 extending through apertured lugs 24 carried by said frame. The tongue 22 is also connected by a hook 25 to a strap 26 fastened upon the beam 3 by the king bolt 4.

27 denotes a suitable draft gear or appliance carried by the tongue 22 and to this draft gear is hitched the power, as horses or traction engine for drawing the machine or implement over a road or soil.

The longitudinal beams 1 and 2 intermediate the ends thereof are recessed as at 28 for slotted sockets 29, and extending into these sockets are plates 30 having racks 31. Meshing with the racks 31 are pinions 32 mounted upon shafts 33 journaled in bearings 34 located upon the sockets 29. The shafts 33 are provided with cranks 35 and connected with said cranks are rods 36, which connect with the cranks 37 of a transverse shaft 38, journaled in the beams 1 and 2, said beams being cut away as at 39 to provide clearances for the ends of the shaft and the cranks carried thereby. The shaft 38 is provided with another crank 40 and this crank is connected by a pitman 41 to a lever 42, pivotally connected to the inner side of the beam 2. It is through the medium of this lever that the plates 30 are raised and lowered, and to lock the plates in an adjusted position a toothed locking member 43 is pivotally mounted upon the beam 2 and is swung into engagement with the lever 42 to hold the same in adjusted position.

44 denotes a shaft extending through slots 45 in the beams 1 and 2 and slots 46 in the plates 30 into said plates. Upon this shaft 44 is mounted a gathering roll 47 having rows of equally spaced gathering or pick-up arms 48. Upon the shaft 44 contiguous to the beam 1 are a sprocket wheel 49 and a gear wheel 50, the former being located in the recessed inner side 51 of the beam 1.

52 denotes a shaft journaled in the upper ends of the plates 30, and upon this shaft are mounted a plurality of radially disposed crushing wheels 53, said wheels being staggered with relation to the gathering arms 48, whereby said arms can swing between said wheels. The shaft 52 is provided with a gear wheel 54 meshing with the gear wheel 50, whereby the shafts 44 and 52 will be revolved simultaneously and in opposite directions.

55 denotes a semi-cylindrical hood pivotally mounted upon the beams 1 and 2, as at 56, the ends of said hood being slotted, as at 57, to provide clearances for the shaft 52.

58 denotes a transverse shaft carried by the beams 1 and 2 in the rear of the roll 46, and fulcrumed upon this shaft is a tiltable hopper 59 having the forward edge thereof extending in proximity to the roll 47 and slotted, as at 60, to provide clearances for the gathering arms 48 of said roll. The beams 1 and 2 are provided with a transverse plate 61, which forms the rear end of the hopper 59 and prevents the forward slotted edge of said hopper from contacting with the roll 47.

To tilt the hopper 59 to discharge dumpable material contained therein, the hopper 59 adjacent to the beam is provided with an upwardly extending arm 62, and connecting with this arm is a forwardly extending rod 63. The forward end of the rod 63 is pivotally connected to a lever 64 pivotally carried by the beam 2, and to lock said lever in adjusted position a locking member 65 is employed, said member being pivotally mounted upon the beam 2.

The rear ends of the beams 1 and 2 are provided with bearings 66 for a transverse revoluble shaft 67. Upon this shaft are mounted the spiders 68 of a cylindrical roller 69. The spider 68 adjacent to the beam 1 is provided with a gear wheel 70 and meshing with said gear wheel is a small gear wheel 71 formed integrally with a sprocket wheel 72. This sprocket wheel is revolubly mounted upon the shaft 73, journaled in a bearing 74 hinged upon the beam 1, as at 75. This bearing is provided with a bifurcated extension 76 and adapted to engage in said extension is a pivoted locking member 77 retained in engagement with said extension by a pin 78. The hinged bearing 74 is provided with a crank 79, and connected to said crank is a forwardly extending rod 80 having the forward end thereof connected to a lever 81 pivotally carried by the inner side of the beam 1. This lever, similar to the levers 42 and 64 is held in adjustment by a toothed locking member 82 pivotally mounted upon the beam 1.

83 denotes a sprocket chain adapted to travel over the sprocket wheels 49 and 72.

84 denotes a transverse brace connecting the beams 1 and 2 in front of the roll 47, and located centrally of said brace is a driver's seat 85, which is also connected by a brace 86 to the transverse beam 3. This driver's seat is provided with a depending tool casing 87 normally closed by a plate 88 countersunk in the seat 85.

89 denotes a brace connecting the transverse beam 3 with the inner sides of the beams 1 and 2.

Since the levers 42–64 and 81 are located in proximity to the driver's seat 85, the operation of the roll 47 and the roller 69 can be easily controlled besides the discharge of crushed stones and similar matter from the hopper 59. It is thought that the operation of the lever 81 to move the gear wheel 71 into and out of engagement with the gear wheel 70 will be fully understood, it being necessary to elevate the gear wheel 71 when it is desired to easily move the machine rearwardly.

Through the medium of the harrow at the forward end of the machine, said machine can be advantageously used as an agricultural implement for removing and crushing stones upon a stony field. With the harrow in an elevated position, the remainder of the machine can be used for maintaining roads and public highways in perfect condition. In both instances, however, separate and distinct machines heretofore used have been combined in a single machine easily controlled by a single driver or operator.

While in the drawings forming part of this specification there has been illustrated a preferred arrangement of the structural elements of the invention, we reserve the right to rearrange these elements and make the same of various sizes and proportions relative to one another without departing from the spirit and scope of the invention.

Having now described our invention, what we claim as new, is:

1. A machine of the type described, comprising longitudinal beams, a beam connecting the forward ends of said beams, a movable bolster connected to said beam, harrow frames carried by said bolster, an adjustable truck carried by said bolster, means for adjusting said truck, a roller revolubly supported between the rear ends of said beams, a revoluble gathering roll adjustably supported by said beams and adapted to be driven by a movement of said roller, revoluble crushing arms arranged above said roll and adapted to be revolved through the medium of said roll, means carried by said beams for adjusting said roll, means carried by one of said beams for controlling the operation of said roller, a tiltable hopper arranged between said roller and said roll for receiving material from said roll, means carried by one of said beams for tilting said hopper to discharge the contents thereof in the path of said roller, and a pivoted hood carried by said beams and adapted to fit over said crushing arms and said roll.

2. A machine of the type described, comprising longitudinal beams, a beam connecting the forward ends of said frames, a movable bolster connected to said beam, harrow frames carried by said bolster, an adjustable truck carried by said bolster, means for adjusting said truck, a roller revolubly supported between the rear ends of said beams, a revoluble gathering roll adjustably supported by said beams and adapted to be driven by a movement of said roller, revoluble crushing arms arranged above said roll and adapted to be revolved through the medium of said roll, means carried by said beams for adjusting said roll, means carried by one of said beams for controlling the operation of said roller, a tiltable hopper arranged between said roller and said roll for receiving material from said roll, and means carried by one of said beams for tilting said hopper to discharge the contents thereof in the path of said roller.

3. A machine of the type described, comprising longitudinal beams, a truck supporting the forward ends of said beams, a revoluble roller carried by the rear ends of said frames, an adjustable gathering roll revolubly supported by said beams and adapted to be driven by a movement of said roller, revoluble crushing arms arranged above said roll and adapted to be revolved by a movement of said roll, and means supported by said beams for delivering matter crushed by said arms in the path of said roller.

4. A machine of the type described, comprising beams, a truck supporting the forward ends of said beams, a roller revolubly supported by the rear ends of said beams, an adjustable gathering roll revolubly supported by said beams and adapted to be driven by said roller, revoluble crushing arms arranged above said roll and adapted to be driven thereby, and a tiltable hopper arranged between said beams for delivering matter crushed by said arms in the path of said roller.

5. A machine of the type described, comprising longitudinal beams, a truck supporting the forward ends of said beams, a revoluble roller supporting the rear ends of said beams, a gathering roll adjustably supported by said beams and adapted to be driven by said roller, revoluble crushing arms arranged above said roll and adapted to be revolved thereby, a tiltable hopper arranged between said beams for discharging crushed matter in the path of said roller, and means carried by one of said beams for tilting said hopper.

6. A machine of the type described, comprising longitudinal beams, a truck supporting the forward ends of said beams, a revoluble roller supporting the rear ends of said beams, a gathering roll adjustably supported by said beams and adapted to be driven by said roller, revoluble crushing arms arranged above said roll and adapted to be revolved thereby, a tiltable hopper arranged between said beams for discharging crushed matter in the path of said roller, and means carried by one of said beams for controlling the operation of said roller.

7. A machine of the type described, comprising longitudinal beams, a truck supporting the forward ends of said beams, a revoluble roller supporting the rear ends of said beams, a gathering roll adjustably supported by said beams and adapted to be driven by said roller, revoluble crushing arms arranged above said roll and adapted to be revolved thereby, a tiltable hopper arranged between said beams for discharging crushed matter in the path of said roller, and means carried by said beams for adjusting said roll.

8. A machine of the type described, comprising longitudinal beams, a truck supporting the forward ends of said beams, a revoluble roller supporting the rear ends of said beams, a gathering roll adjustably supported by said beams and adapted to be driven by said roller, revoluble crushing arms arranged above said roll and adapted to be revolved thereby, a tiltable hopper arranged between said beams for discharging crushed matter in the path of said roller, and a hood movably supported by said beams and adapted to inclose said crushing arms.

9. A machine of the type described, comprising beams, a beam connecting the forward ends of said beams, a harrow movable with relation to said beam, a revoluble roller supporting the rear ends of said beams, a gathering roll adjustably supported by said beams and adapted to be driven by said roller, revoluble crushing arms arranged above said roll and adapted to be driven thereby, means for discharging matter crushed by said arms in the path of said roller, means carried by one of said beams for controlling the operation of said roller and said roll, and means carried by said beams for adjusting said roll.

10. A machine of the type described, comprising beams, a truck supporting the forward ends of said beams, a revoluble roller supporting the rear ends of said beams, revolving crusher arms driven through the medium of said roller, adjustable means carried by said frames for placing matter in position to be crushed by said arms, and means for discharging crushed matter into the path of said roller.

In testimony whereof we affix our signatures in the presence of two witnesses.

MÁTHIÁS LÁMPL.
MATHIAS LAMPL.

Witnesses:
H. C. EVERT,
MAX H. SROLOVITZ.